United States Patent [19]
Izukawa

[11] Patent Number: 5,136,215
[45] Date of Patent: Aug. 4, 1992

[54] DRIVING CIRCUIT FOR VIBRATION WAVE MOTOR

[75] Inventor: Kazuhiro Izukawa, Yokohama, Japan

[73] Assignee: Canon Kabushiki Kaisha, Tokyo, Japan

[21] Appl. No.: 779,134

[22] Filed: Oct. 17, 1991

Related U.S. Application Data

[63] Continuation of Ser. No. 584,484, Sep. 17, 1990, abandoned, which is a continuation of Ser. No. 384,104, Jul. 24, 1989, abandoned, which is a continuation of Ser. No. 131,469, Dec. 11, 1987, abandoned.

[30] Foreign Application Priority Data

Dec. 15, 1986 [JP] Japan ................. 61-299394

[51] Int. Cl.$^5$ ............................................. H01L 41/08
[52] U.S. Cl. ................................. 318/116; 310/316; 310/323
[58] Field of Search ............... 310/323, 308, 316, 317; 318/116, 118

[56] References Cited

U.S. PATENT DOCUMENTS

| | | | |
|---|---|---|---|
| 4,510,411 | 4/1985 | Hakamata et al. | 310/316 |
| 4,513,219 | 4/1985 | Katsuma et al. | 310/328 |
| 4,560,263 | 12/1985 | Katsuma et al. | 310/328 X |
| 4,658,172 | 4/1987 | Izukawa | 310/316 |
| 4,692,649 | 9/1987 | Izukawa et al. | 310/323 X |
| 4,692,672 | 9/1987 | Okuno | 310/328 X |
| 4,713,571 | 12/1987 | Suzuki et al. | 310/328 X |
| 4,727,276 | 2/1988 | Izukawa et al. | 310/323 X |
| 4,743,788 | 5/1988 | Takagi et al. | 310/316 |
| 4,743,789 | 5/1988 | Puskas | 310/316 |
| 4,749,896 | 6/1988 | Suzuki et al. | 310/316 |
| 4,794,294 | 12/1988 | Shimizu et al. | 310/323 X |
| 4,812,699 | 3/1989 | Ogawa | 310/316 |
| 4,833,358 | 5/1989 | Suzuki et al. | 310/316 |

*Primary Examiner*—Mark O. Budd
*Attorney, Agent, or Firm*—Fitzpatrick, Cella Harper & Scinto

[57] ABSTRACT

A driving circuit for a vibration wave motor uses an AC signal supplied to a piezoelectric member provided on a vibration member to cause a travelling vibration wave in the vibration member, thus driving a movable member. The frequency of the AC signal supplied to the piezoelectric member is determined in a first mode in which the frequency is manually selected, or in a second mode in which a particular resonant frequency is automatically selected according to the vibration state of the motor, wherein the operation is automatically switched from the first mode to the second mode upon detection that the AC signal approaches the particular frequency.

24 Claims, 6 Drawing Sheets (a) R1
(b) V1
(c) OUT

DRIVING CIRCUIT FOR VIBRATION WAVE MOTOR

This application is a continuation of U.S. patent application Ser. No. 07/584,484 filed Sept. 17,1990, which is a continuation application of U.S. Pat. Ser. No. 07/384,104 filed on Jul. 24, 1989, which is also a continuation application of U.S. Pat. Ser. No. 07/131,469 filed on Dec. 11, 1987, all applications now abandoned.

BACKGROUND OF THE INVENTION

1. Field of the Invention

The present invention relates to a driving circuit for a vibration wave motor.

2. Related Background Art

For efficient driving of a vibration wave motor the use of resonance frequency is desirable, and, for achieving this objective the present applicant already proposed, in the Japanese Patent Application No. 226566/1985, to detect the vibration state of the motor with a monitor electrode, and to maintain a constant phase difference between the signal from the monitor electrode and the driving signal.

Such a method allows the vibration wave motor to be driven always at its resonance frequency, but is inconvenient for speed control of the motor.

The speed control of such motor can be achieved usually by a change in the driving frequency, but the above-mentioned method, in which the driving frequency is always controlled by the resonance frequency, is unable to achieve a large change in the driving frequency, so that a large change in the revolution of the motor cannot be achieved.

SUMMARY OF THE INVENTION

An object of the present invention is to provide a control device for a vibration wave motor, in which the operation mode of the motor is divided into a first mode in which the driving frequency for the motor is arbitrarily selectable and a second mode in which the driving frequency is controlled by a phase difference control, and the operation is shifted from the first mode to the second mode when the driving frequency in said first mode approaches the resonance frequency whereby the speed control of the motor can be achieved over a wide range.

Another object of the present invention is to provide a control device for a vibration wave motor, according to the above-mentioned object, capable of identifying whether said driving frequency has approached said resonance frequency, by detecting the phase difference between the signal from the above-mentioned monitor electrode and the driving signal and thus to switch operation from said first mode to said second mode.

Still another object of the present invention is to provide a control device for a vibration wave motor, according to the above-mentioned objects, capable of forming pulses of a duty ratio corresponding to said phase difference in the detection of said phase difference and to provide a timer circuit for measuring the duration of said pulses, thereby quantatively detecting the difference between said driving frequency and the resonance frequency.

The foregoing and still other objects of the present invention, and the advantages thereof, will become fully apparent from the following description of embodiments, to be taken in conjunction with the attached drawings.

DETAILED DESCRIPTION OF THE PREFERRED EMBODIMENTS

Figure 1:
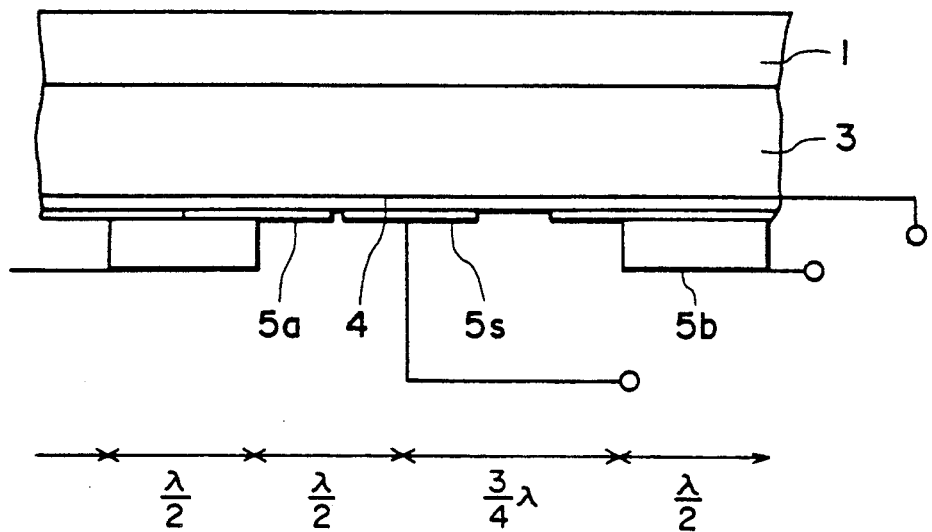
FIG. 1 is a cross-sectional view of a vibration wave motor of the present invention.

FIG. 1 is a cross-sectional view of a vibration wave motor of the present invention, seen from the radial direction, wherein shown are a rotor 1; a vibration member 3; a piezoelectric member 4 provided on said vibration member 3 and suitably polarized; and electrodes 5. The vibration member 3 and the piezoelectric member 4 constitute a stator, on which lies the rotor 1 in frictional contact therewith.

The electrodes 5 are composed of driving electrodes 5a positioned with a pitch of $\lambda/2$ on the piezoelectric member 4, driving electrodes 5b positioned likewise with a pitch of $\lambda/2$, wherein $\lambda$ is the wavelength of a flexural travelling wave in the vibration member 3, and vibration detecting electrodes 5S displaced from the driving electrodes 5a by a positional phase of $\lambda/2$. The electrodes 5b are displaced from the electrodes 5a by a positional phase of $3\lambda/4$ whereby the piezoelectric member receiving the driving voltage from the electrode 5a constitutes a phase A while the piezoelectric member receiving the driving voltage from the electrode 5b constitutes a phase B. The polarization process for the piezoelectric member and the arrangement of electrodes are already known and will not therefore be explained in detail.

In the above-explained structure, alternating voltages of a phase difference of 90° are respectively supplies to the electrodes 5a and electrodes 5b to generate a travelling vibration wave on the vibration member, thereby driving the rotor 1. The state of vibration is detected by an output signal from the piezoelectric member to which the electrode 5S is attached, and the phase difference between the signals of the electrodes 5S and 5a assumes a form as represented by a curve A in FIG. 2. More specifically, when the frequency of the driving signal to the electrode 5a is equal to the resonance frequency fr, the signal from the electrode 5S has a phase difference of −90° with respect to the driving signal to the electrode 5a, but, if the frequency of the driving signal is displaced from the resonance frequency, the phase difference between the electrodes 5a and 5S becomes different from 90° as shown by the line A in FIG. 2. Consequently, in the present invention, the aberration of the driving frequency from the resonance frequency fr is detected from said phase difference.

Naturally, the phase difference between the signals of the electrodes 5a and 5S varies from −90° according to the positions of said electrodes 5a and 5S, but said phase difference assumes a particular value in the driving state under resonant vibration. Therefore, also in this case, the aberration of the driving frequency from the resonance frequency fr can be determined by detecting the displacement of the phase difference of the signals of the electrodes 5a and 5S from said particular phase difference.

Figure 3:
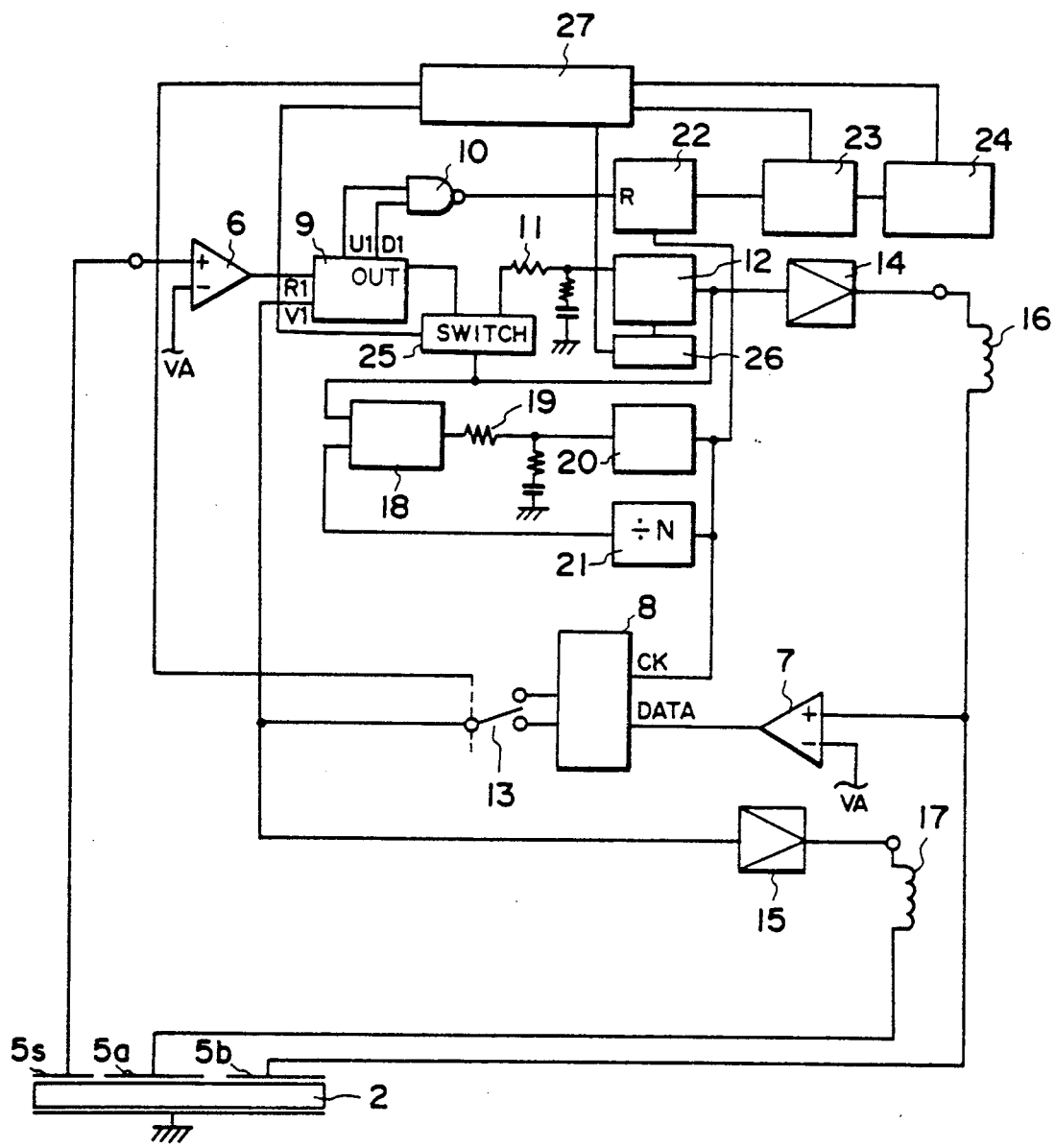
FIG. 3 is a circuit diagram showing an embodiment of the driving circuit for the vibration wave motor of the present invention.

FIG. 3 is a circuit diagram showing an embodiment of the driving circuit for the vibration wave motor of the present invention.

Figure 2:
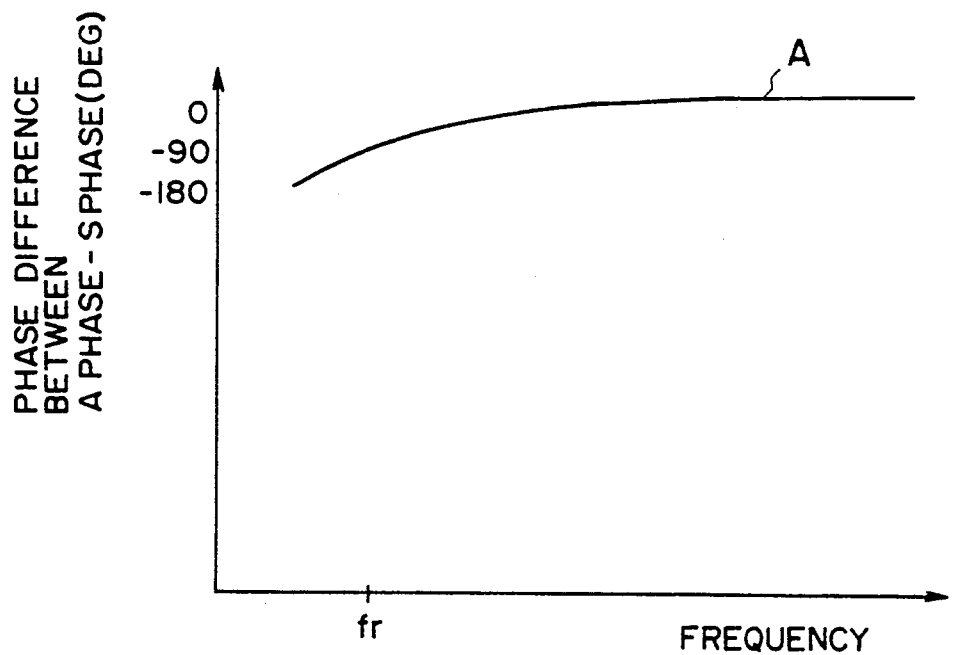
FIG. 2 is a chart showing the principle of the present invention.

In FIG. 3 there are shown a stator 2 of the vibration wave motor shown in FIG. 2; a voltage-controlled oscillator for generating a frequency corresponding to an input voltage; an amplifier 14 and a matching coil 16 for supplying the signal from the oscillator 12 to the electrode 5a; a comparator 7 for shaping a voltage wave, supplied from the amplifier 14 through the coil 16 for supply to the stator of the vibration wave motor, into a pulse signal; and a shift register 8 for shifting the pulse from the comparator 7 by 90° for supply to the electrode 5b through a rotating direction selecting switch 13, said pulse being supplied to the electrode 5b through the rotating direction selecting switch 13, amplifier 15 and coil 17. The above-explained structure provides the electrodes 5a and 5b, respectively, with alternating voltages of a mutual phase difference of 90°. An edge trigger phase comparator 18 receives the output of said oscillator 12 and the output of a frequency divider (1/32 frequency divider) 21. A voltage-controlled oscillator 20 generates a frequency corresponding to the output of said comparator 18 through a La-grid filter 19. Said comparator 18 is opened, when the phase difference between the input signals is zero, to maintain the output of the oscillator 20 without change. In the case of a phase difference between said input signals, it generates a signal of varying duty ratio according to the amount of said phase difference, thereby increasing or decreasing the output frequency of the voltage-controlled oscillator 20.

More specifically, there is detected the phase difference between the output pulses of the oscillator 12 and those of the frequency dividing circuit 21, and, if the phase of the output pulses of the frequency dividing circuit 21 is delayed with respect to that of the oscillator 12, or if the frequency of the output pulses of the frequency dividing circuit 21 becomes smaller, the phase difference comparator 18 releases a high-level output signal to increase the output frequency of the oscillator 20. On the other hand, if the phase of the output pulses of the frequency dividing circuit 21 is advanced with respect to that of the oscillator 12, or if the frequency of the output pulses of the frequency dividing circuit 21 becomes larger, said phase difference comparator 18 releases a low-level output signal to decrease the output frequency of the oscillator 20.

The above-explained structure controls two inputs to the comparator 18 toward a same phase, and, consequently, the phase and frequency of the output of the frequency dividing circuit 21 become the same as those of the oscillator 12. Therefore, the output signal of the oscillator 20 has a frequency $f_2'$ equal to N times (32 times) of the output frequency $f_1'$ of the oscillator 12 ($f_2' = f_1'/N = f_1'/32$). Since said output signal is used as the clock signal for the shift register 8, the output of an N/4-th step of the register 8 is different by 90° in phase with respect to the output of the oscillator 12. In this manner the electrodes 5b and 5a receive alternating signals with a mutual phase difference of 90°. The detailed structure of the shift register 8 is shown in FIG. 4C.

Figure 4A:
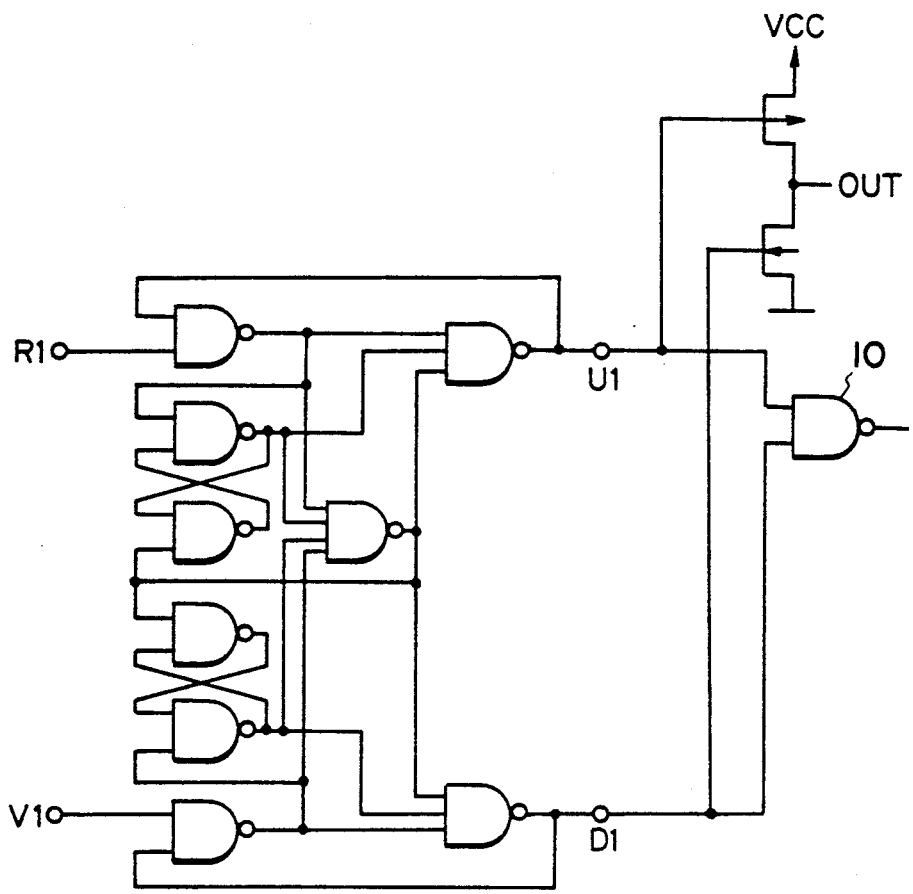
FIG. 4A is a circuit diagram showing the structure of a comparator 9 shown in FIG. 3.
Figure 4B:
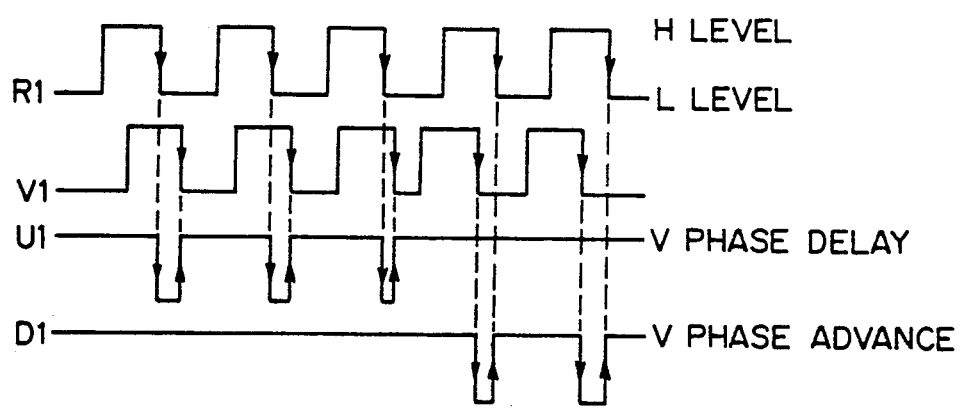
FIG. 4B is a waveform chart showing the function of the comparator shown in FIG. 3.
Figure 4C:
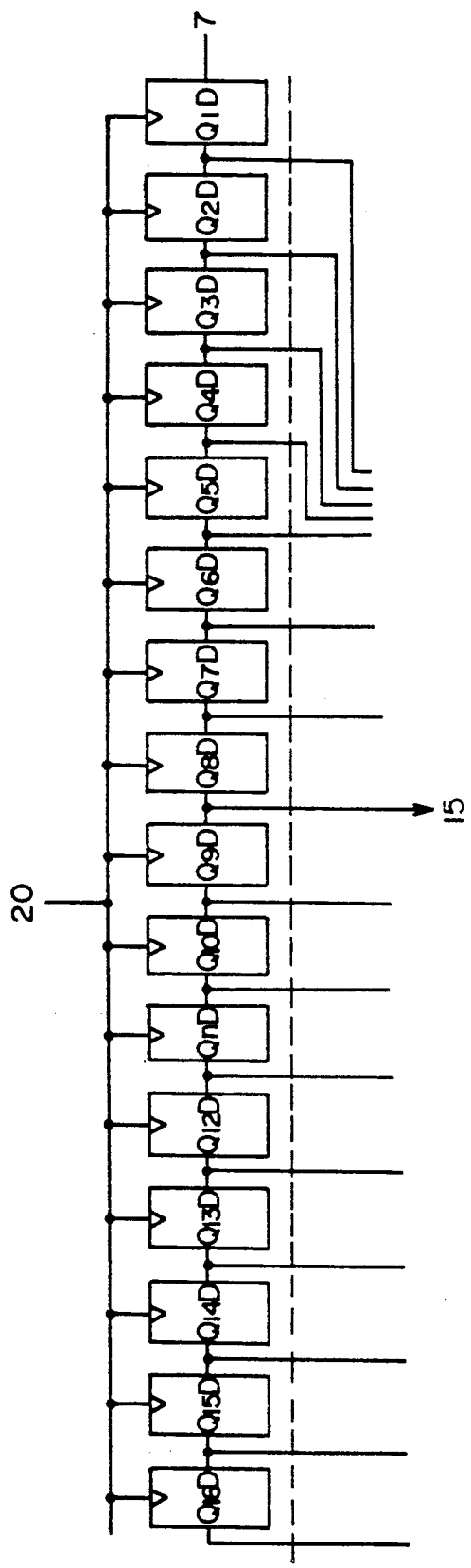
FIG. 4C is a circuit diagram showing the structure of a shift register 8 shown in FIG. 3.
Figure 5:
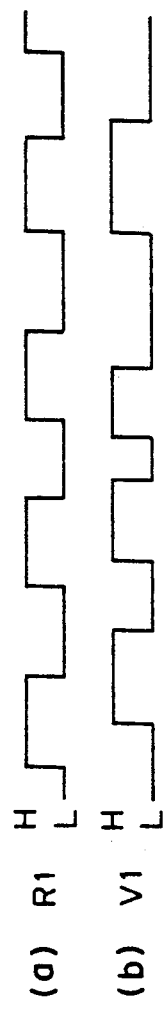
FIGS. 5(a) to 5(c) are waveform charts showing the function of the comparator shown in FIG. 4A.

There are also provided a comparator 6 for shaping the signal from the electrode 5S into pulse signals, and an edge trigger phase comparator 9 constructed as shown in FIG. 4A. Said comparator detects the phases of input pulses $R_1$, $V_1$, and, if the phase of the input pulses $R_1$ is advanced with respect to that of the input pulses $V_1$ as shown in FIG. 4B, an output signal $U_1$ is shifted to the low level during the periods of such phase difference, while, if the phase of the input pulses $R_1$ is delayed with respect to that of the input pulses $V_1$, an output signal $D_1$ is shifted to the low level during the periods of such phase difference. If two input pulses are of a same phase, the output signals $U_1$, $D_1$ are both maintained at the high level. Another output terminal OUT of said comparator 9 provides an output waveform as shown in FIG. 5, in relation to the input pulses $R_1$ and $V_1$.

Again referring to FIG. 3, an open/closed loop control selector switch 25 disconnects or connects the output terminal OUT of the comparator 9 from or with a filter 11 respectively in an open loop control mode or in a closed-loop control mode. A voltage-controlled oscillator generates a variable output frequency according to the signal from the output terminal OUT of the comparator 9 in said closed-loop control mode. There are also provided a NAND gate 10 connected to the outputs $U_1$, $D_1$ of the comparator 9; a counter 22 whose reset terminal is connected to said NAND gate 10 and adapted to be released from the reset state and to count the clock pulses from said oscillator 20 when the NAND gate 10 provides a high-level output; a numerical data setting device 24; a comparator 23 for comparing the count of the counter 22 with the set value of said numerical data setting device 24 and releasing a high-level signal when the former is smaller than the latter; and a microcomputer 27 for releasing a switching signal for shifting the switch 25 to the closed-loop control mode when said comparator 23 releases the high-level signal continuously over a predetermined period.

A setting circuit 26 is provided for setting an intrinsic frequency $f_0$ of the oscillator 12.

In the following there will be explained the function of the embodiment shown in FIG. 3.

It is assumed that the open/closed loop control selector switch 25 is at first set at the open loop control mode. In this state the voltage-controlled oscillator 12 is in oscillation with an intrinsic frequency $f_0$, higher than the mechanical resonance frequency fr of the vibration wave motor, independently from the output of the phase comparator 9. The electrodes 5a of the vibration wave motor receive the signal from the voltage-controlled oscillator 12, through the amplifier 14 and coil 16. The signal from the oscillator 12 is shaped by the A-phase comparator 7 and supplied to the shift register 8 driven by a clock signal of a frequency equal to N times that of said frequency $f_0$.

Thus, a signal displaced by 90° in phase (±N/4 steps) from the input signal is obtained from said register 8 and supplied to the electrodes 5b of the vibration wave motor through the switch 13, amplifier 15 and coil 17.

In this manner the electrodes 5a receive the output signal of the oscillator 12, while the electrodes 5b receive a signal displaced by 90° in phase with respect to the signal supplied to the electrodes 5a.

The alternating voltages of a mutual phase difference of 90° respectively supplied to the electrodes 5a, 5b generate standing waves in the piezoelectric members of phases A and B, and said standing waves are synthesized to generate a travelling wave, thereby driving the rotor.

In this state of electrodes 5S generate an alternating signal corresponding to the vibration state of the motor with a phase difference to the signal to the electrodes 5a, related to the frequency thereof as shown in FIG. 2. More specifically, in a driving state under the resonance frequency fr, the phase difference between the signals of the electrodes 5a, 5b is equal to $-90°$, and said phase difference varies as represented by the line A in FIG. 2, as a function of the displacement from the resonance frequency.

For detecting the phase difference between the signals of the electrodes 5a and 5b, the signal from the electrodes 5S is supplied, after shaping in the comparator 6, to an input terminal $R_1$ of the phase comparator 9, and the output signal of the oscillator 12 for generating the driving signal to the electrodes 5a is supplied, after shaping in the comparator, to the register 8 and, after a phase shift of 90° therein, to the other input terminal $V_1$ of said comparator 9.

Because of a relationship $f_0 > f_r$, a phase difference exists between the input signals to the comparator 9. In this state, therefore, the output terminals $U_1$ and $D_1$ of the comparator 9 intermittently release low-level signals, so that the NAND gate 10 intermittently releases high-level signals. The duration of said high-level signal from the NAND gate 10 becomes longer as the phase difference between the input signals at $R_1$ and $V_1$ increases. The counter 22 is activated by the high-level signal from the NAND gate 10 and counts the clock pulses from the oscillator 20 during said high-level signal, so that the count thereof corresponds to said phase difference. Said count is compared with the set value of the setting device 24, and, if the former is smaller than the latter, the comparator 23 releases a high-level signal.

On the other hand, if the count is larger than the set value, the comparator 23 releases a low-level signal, in response to which the computer 27 releases an instruction to reduce the set value of the setting device 26, thereby decreasing the output frequency of the oscillator 12. In this manner, as long as the count is larger than the set value, the output frequency of the oscillator 12 is gradually decreased and approaches the resonance frequency fr, and, when the count becomes smaller than the set value, the comparator releases the high-level signal.

In response to the high-level signal from said comparator 23, the computer 27 releases an instruction to shift the selector switch 25 to the open loop control mode.

Figure 6:
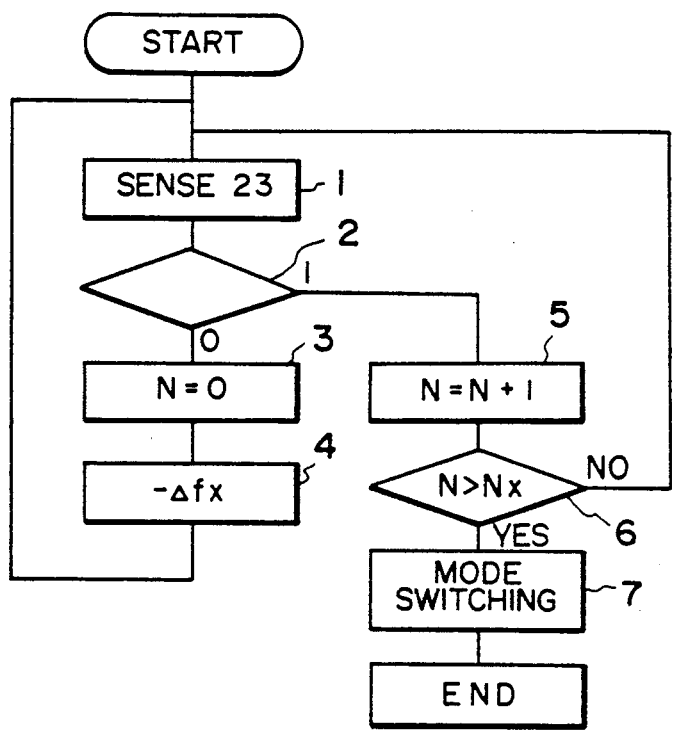
FIG. 6 is a flow chart showing the control sequence of a computer 27 shown in FIG. 3.

The above-explained function will be explained further in relation to a flow chart shown in FIG. 6. The computer 27 is activated at the start of power supply. A step 1 senses the output of the comparator 23, and a step 2 discriminates thus sensed output of the comparator 23. If the above-mentioned phase difference is large, the count becomes larger than the set value, so that the output of the comparator 23 assumes the low-level state.

Then a step 3 resets the count (variable) to zero, and a step reduces the set value of the setting device 26 by a predetermined value $-\Delta f_x$, and the sequence returns to the step 1. Thereafter the above-explained steps are repeated, as long as the output of the comparator 23 remains at the low-level state, to gradually reduce the output frequency of the oscillator 12 toward the resonance frequency fr. When the output frequency of the oscillator 12 comes close to the resonance frequency fr through the above-explained procedure, the phase difference becomes smaller so that the count cannot be larger than the set value but remains continuously smaller. Consequently, the output of the comparator 23 does not assume the low-level state but remains at the high-level state. Thus the sequence does not proceed, from the step 2, to the step 3 but to a step 5 for a step increment of the variable N. A next step 6 discriminates whether a condition $N > N_x$, and, if not, the sequence returns to the step 1 and the sequence of steps 1, 2, 5 and 6 is repeated until the condition $N > N_x$ is satisfied through gradual increase of N. When said condition is satisfied, a step 7 is executed to shift the switch 25 to supply the output of the comparator 9 to the filter 11, thus adopting the closed-loop control mode.

In the closed-loop control mode, the output signal OUT of the comparator 9 is supplied through the filter 11 to the oscillator 12, and the output frequency thereof is thereafter controlled by the signal from the output terminal OUT of the comparator 9.

In the closed-loop control, the output signal of the comparator 9 shows a characteristic shown in FIG. 5(c). Thus, if the phase difference between the output signal of the electrode 5S and the signal to the electrodes 5a exceeds 90°, the output signal of the comparator 9 is shifted to the high-level state to increase the frequency of the oscillator 12, thereby advancing the phase of the signal to the electrodes 5a with respect to that of the output signal from the electrodes 5S toward a phase difference of 90°. On the other hand, if the phase difference between the signals of the electrodes 5S and 5a is less than 90°, the comparator 9 releases a low-level output signal to reduce the frequency of the oscillator 12 toward a phase difference of 90°. In this manner, in the closed-loop control mode, the control is to be conducted as to obtain a phase difference of 90°.

In the above-explained embodiment, it is also possible to detect the advance or delay of phase, or the direction of aberration of frequency, by detecting the duration of low-level state in each of the output terminals $U_1$, $D_1$ of the comparator 9.

It is furthermore possible to read said aberration in frequency in numerical display by increasing the set value of the setting device 24 at each low-level output, or namely at each detection that the count is larger than the set value and by reading the set value when the count becomes smaller than the set value.

Figure 7:
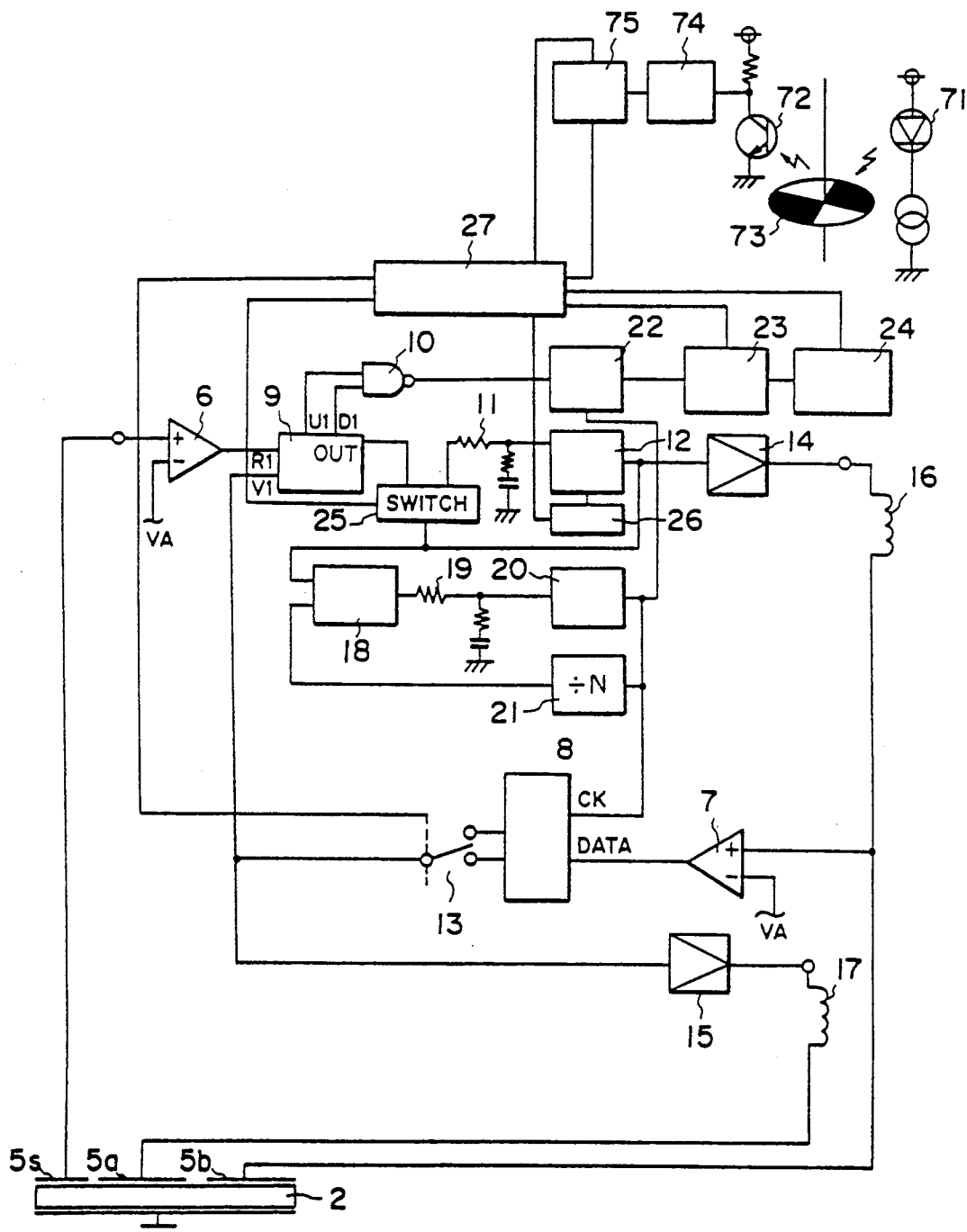
FIG. 7 is a circuit diagram showing another embodiment of the present invention.

FIG. 7 shows another embodiment of the present invention, wherein same components as those in FIG. 3 are represented by the same numbers or symbols. The embodiment shown in FIG. 7 is different from the foregoing embodiment in the presence of a rotary plate 73 having black-and-white patterns rotatable with the rotor (shown in FIG. 1) of the vibration wave motor; a light-emitting diode (LED) 71 of which light beam is reflected by white patterns on said rotary plate 73; a photosensor 72 for receiving thus reflected light; a processing circuit 74 for converting the output signal of said photosensor 72 into pulse signals; and a counter 75 for counting the pulses from said processing circuit and to be reset by the computer 27 at a predetermined interval.

Figure 8:
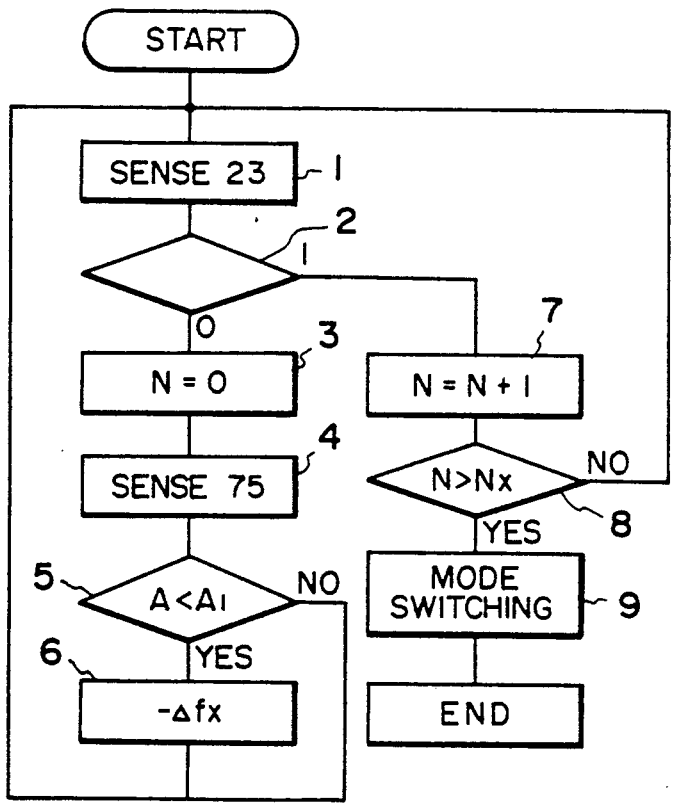
FIG. 8 is a flow chart showing the control sequence of the computer 27 shown in FIG. 7.

Now reference is made to a flow chart shown in FIG. 8, for explaining the function of the circuit shown in FIG. 7.

Also in the embodiment shown in FIG. 7, in the course of motor driving control, a step 1 senses the output of the comparator 23, and, if a step 2 identifies that the count of the counter 22 is larger than the set value, indicating that the motor is significantly displaced from the resonant state, the sequence proceeds to a step 3 for setting the variable N to zero and a step 4 for detecting the count of the counter 75. Said counter 75 is reset at a constant interval and counts, after each resetting, the number of pulses from the circuit 74. The interval of said pulses varies corresponding to the rotating speed of the rotor, so that the count A becomes larger as the revolution of the motor increases.

A step 5 compares thus detected count A with a motor speed value $A_1$ manually set in advance, and, in case of $A<A_1$ indicating that the motor speed is lower than the set speed, the sequence proceeds to a step 6 for decreasing the driving frequency by $-\Delta f_x$ thereby increasing the motor speed. Thereafter the above-explained steps are repeated, and, when the motor reaches the set speed, the sequence proceeds from the step 5 to the step 1. Thereafter the decrease of the driving frequency is inhibited, and the motor is driven at the set speed.

In the course of the above-explained motor speed control toward the set speed, if the motor reaches the resonance frequency, the sequence branches from the step 2 to steps 7, 8 and 9, thus entering the closed-loop control mode.

In this manner the present embodiment allows to obtain an arbitrary motor speed by varying the driving frequency, and switches the operating mode to the closed loop control when the driving frequency reaches the resonance frequency, thus realizing the highest speed with resonance motor drive.

As explained in the foregoing, the present invention allows the vibration wave motor to be driven with driving frequencies of a wide range, and to achieve efficient close-loop motor drive in the resonance driving range.

In the foregoing embodiments the switch-over from the open-loop drive to the closed-loop drive is conducted when the driving frequency becomes close to the resonance frequency, but said switch-over may be conducted when said resonance frequency is reached. Also the electromechanical energy conversion element provided on the vibrating member is composed of a piezoelectric member, but it may also be composed of an electrostriction element.

What is claimed is:

1. A driving circuit for a vibration motor, comprising:
   (a) a vibration member;
   (b) an electromechanical energy conversion element provided on said vibration member;
   (c) a movable member maintained in contact with said vibration member;
   (d) an application means for applying an alternating signal to said energy conversion element, thereby generating a vibration wave in said vibration member as a driving force;
   (e) a frequency adjusting circuit for adjusting the frequency of said alternating signal applied by said application means, said adjusting circuit being provided with a first mode for adjusting the frequency of said alternating signal toward a particular frequency while detecting the driving state of the motor, and a second mode for adjusting the frequency of said alternating signal independently from the driving state of said motor; and
   (f) a switching circuit for detecting the alternating signal and switching said adjusting circuit from said second mode to said first mode when the frequency of the alternating signal reaches or becomes close to said particular frequency.

2. A driving circuit according to claim 1, wherein said particular frequency is the resonance frequency of the motor.

3. A driving circuit according to claim 2, wherein said adjusting circuit comprises motor speed data setting means; and an output circuit for releasing an alternating signal of a frequency corresponding to the speed set by said setting means; wherein the alternating signal from said output circuit is transmitted to said application means when said adjusting circuit is in the second mode.

4. A driving circuit according to claim 1, wherein said electromechanical energy conversion element is a piezoelectric element.

5. A driving circuit according to claim 1, wherein said electromechanical energy conversion element is an electrostriction element.

6. A driving circuit for a vibration motor, comprising:
   (a) a vibration member;
   (b) an electromechanical energy conversion element provided on said vibration member;
   (c) an application means for applying an alternating signal to said energy conversion element, thereby generating a vibration wave in said vibration member as a driving force, the driving force relatively driving an object being in contact with said vibration member;
   (d) an alternating signal forming circuit for generating the alternating signal to be applied by said application means;
   (e) a setting means for setting the frequency of the alternating signal generated by said alternating signal forming circuit, the alternating signal having the frequency generated by said setting means being output from said alternating signal forming circuit;
   (f) a monitor means for detecting the driving state of the motor by detecting the alternating signal and releasing a corresponding driving state signal;
   (g) an adjusting circuit for adjusting the frequency of the alternating signal released by said alternating signal forming circuit, in response to the driving state signal from said monitor means; and
   (h) a switching circuit for disconnecting said alternating signal forming means from said setting means and connecting said adjusting circuit when the driving state signal from said monitor means reaches a particular value in the condition of said motor being driven.

7. A driving circuit according to claim 6, wherein said monitor means is composed of a mechanoelectrical energy conversion element provided on said vibration member and adapted to generate an alternating signal of a frequency corresponding to the driving state of said vibration member; and said adjusting circuit is adapted to determine said frequency according to the phase difference between the alternating signal from said monitor means and the alternating signal applied by said application means to said electromechanical energy conversion element.

8. A driving circuit according to claim 7, wherein said switching circuit is adapted to effect said connection switching when phase difference reaches a predetermined value.

9. A driving circuit according to claim 7, wherein said electromechanical energy conversion means and said mechanoelectrical energy conversion means are composed of piezoelectric elements.

10. A driving circuit according to claim 7, wherein said electromechanical energy conversion means and said mechanoelectrical energy conversion means are composed of electrostriction elements.

11. A driving circuit for a vibration motor, comprising:
   (a) a vibration member;
   (b) an electromechanical energy conversion element provided on said vibration member;
   (c) an application means for applying an alternating signal to said energy conversion element, thereby generating a vibration wave in said vibration member as a driving force, the driving force relatively driving an object being in contact with said vibration member;
   (d) a motor speed information setting means;
   (e) a frequency adjusting circuit for adjusting the frequency of said alternating signal applied by said application means, said adjusting circuit being provided with a first mode for adjusting the frequency of said alternating signal toward a particular frequency while detecting the driving state of the motor, and a second mode for adjusting the frequency of said alternating signal independently from the driving state of said motor on the basis of the speed information set by said motor speed information setting means; and
   (f) a switching circuit for switching said adjusting circuit from said second mode to said first mode when the speed set by said motor speed information setting means in the frequency adjusting of said second mode is not obtained.

12. A driving circuit for a vibration motor, comprising:
   (a) a vibration member;
   (b) an electromechanical energy conversion element provided on a vibration member;
   (c) an application means for applying an alternating signal to said energy conversion element, thereby generating a vibration wave in said vibration member as a driving force, the driving force driving an object being in contact with said vibration member;
   (d) an adjusting circuit having a first mode in which said alternating signal is adjusted while detecting the driving state of the motor and a second mode in which said alternating signal is adjusted irrespective of the driving state of the motor; and
   (e) a switching circuit for detecting the alternating signal and switching said modes of said motor being driven when either the driving state of the motor becomes a predetermined state or the driving frequency of the motor achieves a predetermined value.

13. A vibration motor, comprising:
   (a) a vibration member;
   (b) an electromechanical energy conversion element provided on said vibration member;
   (c) an application means for applying an alternating signal to said energy conversion element, thereby generating a vibration wave in said vibration member as a driving force, the driving force relatively driving an object being in contact with said vibration member;
   (d) a setting circuit for setting a desired frequency information;
   (e) an adjusting circuit for shifting a frequency of said alternating signal, from a predetermined frequency to the desired frequency;
   (f) a control circuit for stopping said adjusting circuit from shifting the frequency of the alternating signal to the desired frequency when the driving state of the motor achieves a predetermined condition.

14. A vibration wave motor device according to claim 13, wherein said motor comprises a detecting means for detecting said alternating signal and for generating an output when the frequency of said alternating signal reaches or becomes close to a resonance frequency.

15. A vibration wave motor device according to claim 13, wherein said frequency information is a target speed information.

16. A system having a vibration wave motor device comprising:
   (a) a vibration member;
   (b) an electromechanical energy conversion element provided on said vibration member;
   (c) an application means for applying an alternating signal to said energy conversion element, thereby generating a vibration wave in said vibration member as a driving force, the driving force relatively driving an object being in contact with said vibration member;
   (d) a setting circuit for setting an information related to a frequency;
   (e) an adjusting circuit for shifting a frequency of said alternating signal, from a predetermined frequency to a frequency corresponding to an information set by said setting circuit;
   (f) a control circuit for stopping said adjusting circuit from shifting the frequency of the alternating signal to the desired frequency when the driving state of the motor achieves a predetermined condition.

17. A system having a vibration motor device comprising:
   (a) a vibration member;
   (b) an electromechanical energy conversion element provided on said vibration member;
   (c) an application means for applying an alternating signal to said energy conversion element, thereby generating a vibration wave in said vibration member as a driving force, the driving force relatively driving an object being in contact with said vibration member;
   (d) a detection means for detecting the driving state of the motor by detecting said alternating signal;
   (e) an adjusting circuit for adjusting the frequency of said alternating signal, said adjusting circuit adjusting the frequency regardless of the driving state detected by said detection means;
   (f) a control circuit for controlling the frequency adjusted by said adjusting circuit so as to keep it higher than a resonance frequency of the motor on the basis of the output from said detection means.

18. A system having a vibration motor device comprising:
   (a) a vibration member;
   (b) an electromechanical energy conversion element provided on said vibration member;
   (c) an application means for applying an alternating signal to said energy conversion element, thereby generating a vibration wave in said vibration member as a driving force, the driving force alternately driving an object being in contact with said vibration member;
   (d) a monitor means for monitoring a vibration state of the motor;
   (e) an adjusting circuit having a first mode in which the alternating signal is adjusted in accordance with the vibration state monitored by said monitor means and a second mode in which the alternating signal is adjusted regardless of the vibration state monitored by said monitor means; and
   (f) a switching circuit for switching the mode of said adjusting circuit when the vibration state monitored by said monitor means reaches or becomes close to a resonant state.

19. A device having a vibration motor in which a periodic signal is applied to an electro-mechanical energy conversion element to form a vibration as a driving force, comprising:
   application means for applying the periodic signal to the energy conversion element;
   a periodic signal forming circuit for generating the periodic signal to be applied by said application means;
   an adjusting circuit for adjusting the frequency of the periodic signal applied by said application means, said adjusting circuit being provided with a first mode for adjusting the frequency of the periodic signal on the basis of the driving state of said motor while detecting the driving state of said motor, and a second mode for adjusting the frequency of the periodic signal independently from the driving state of said motor; and
   a switching circuit for detecting the periodic signal and switching said adjusting circuit from said second mode to said first mode when the frequency of the periodic signal reaches a particular state.

20. A device having a vibration motor in which a periodic signal is applied to an electro-mechanical energy conversion element to form a vibration as a driving force, comprising:
   application means for applying the periodic signal to the energy conversion element;
   a periodic signal forming circuit for generating the periodic signal to be applied by said application means;
   setting means for setting the frequency of the periodic signal generated by said periodic signal forming circuit, the periodic signal having the frequency generated by said setting means being output from said periodic signal forming circuit;
   monitor means for detecting the driving state of said motor by detecting the periodic signal and releasing a corresponding driving state signal;
   an adjusting circuit for adjusting the frequency of the periodic signal generated by said periodic signal forming circuit, in response to the driving state signal from said monitor means; and
   a switching circuit for disconnecting said periodic signal forming means from said setting means and connecting said adjusting circuit when the driving state signal from said monitor means reaches a particular value in the condition of said motor being driven.

21. A device having a vibration motor in which a periodic signal is applied to an electro-mechanical energy conversion element to form a vibration as a driving force, comprising:
   application means for applying the periodic signal to the energy conversion element;
   a periodic signal forming circuit for generating the periodic signal to be applied by said application means;
   an adjusting circuit having a first mode in which the periodic signal is adjusted while detecting the driving state of said motor and a second mode in which the periodic signal is adjusted irrespective of the driving state of said motor; and
   a switching circuit for detecting the periodic signal and switching the mode of said adjusting circuit when either the driving state of said motor reaches a predetermined state or the driving frequency of said motor achieves a predetermined value.

22. A device having a vibration motor in which a periodic signal is applied to an electro-mechanical energy conversion element to form a vibration as a driving force, comprising:
   application means for applying the periodic signal to the energy conversion element;
   a periodic signal forming circuit for generating the periodic signal to be applied by said application means;
   a setting circuit for setting a desired frequency information;
   an adjusting circuit for shifting the frequency of the periodic signal from a predetermined frequency to the desired frequency;
   a control circuit for stopping said adjusting circuit from shifting the frequency of the periodic signal to the desired frequency when the driving state of said motor achieves a predetermined condition.

23. A device having a vibration motor in which a periodic signal is applied to an electro-mechanical energy conversion element to form a vibration as a driving force, comprising:
   application means for applying the periodic signal to the energy conversion element;
   a periodic signal forming circuit for generating the periodic signal to be applied by said application means;
   monitor means for monitoring a vibration state of said motor;
   an adjusting circuit having a first mode in which the periodic signal is adjusted in accordance with the vibration state monitored by said monitor means and a second mode in which the periodic signal is adjusted regardless of the vibration state monitored by said monitor means; and
   a switching circuit for switching the mode of said adjusting circuit when the vibration state monitored by said monitor means reaches a resonant state or a state close to the resonant state.

24. A device according to claim 22, wherein the desired frequency information set by said setting circuit is a target speed.

* * * * *

UNITED STATES PATENT AND TRADEMARK OFFICE
CERTIFICATE OF CORRECTION

PATENT NO. : 5,136,215
DATED : August 4, 1992
INVENTOR(S) : Kazuhiro Izukawa

It is certified that error appears in the above-identified patent and that said Letters Patent is hereby corrected as shown below:

COLUMN 4

Line 5, "12" should read --12.--.

COLUMN 9

Line 67, "vibration motor" should read --vibration motor device,--.

COLUMN 10

Line 40, "a" should read --the--.

COLUMN 11

Line 1, "device" should read --device,--.

Signed and Sealed this

Seventh Day of September, 1993

Attest:

BRUCE LEHMAN

Attesting Officer　Commissioner of Patents and Trademarks